(12) United States Patent
Liu et al.

(10) Patent No.: US 9,910,840 B2
(45) Date of Patent: Mar. 6, 2018

(54) ANNOTATING NOTES FROM PASSIVE RECORDING WITH CATEGORIES

(71) Applicant: Microsoft Technology Licensing, LLC, Redmond, WA (US)

(72) Inventors: Jie Liu, Bellevue, WA (US); Mayuresh P. Dalal, San Jose, CA (US); Michal Gabor, Bellevue, WA (US); Gaurang Prajapati, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/832,144

(22) Filed: Aug. 21, 2015

(65) Prior Publication Data

US 2016/0292141 A1    Oct. 6, 2016

Related U.S. Application Data

(63) Continuation-in-part of application No. 14/678,611, filed on Apr. 3, 2015.
(Continued)

(51) Int. Cl.
*G10L 15/00* (2013.01)
*G06F 17/24* (2006.01)
(Continued)

(52) U.S. Cl.
CPC .......... *G06F 17/241* (2013.01); *G10L 15/265* (2013.01); *G11B 20/10527* (2013.01);
(Continued)

(58) Field of Classification Search
None
See application file for complete search history.

(56) References Cited

U.S. PATENT DOCUMENTS 5,786,814 A    7/1998 Moran et al.
5,970,455 A    10/1999 Wilcox et al.
(Continued)

FOREIGN PATENT DOCUMENTS

WO    2014041399 A1    3/2014

OTHER PUBLICATIONS

Bourlard, et al., "Recognition and Understanding of Meetings Overview of the European AMI and AMIDA Projects", Retrieved on: Dec. 30, 2014, Available at: http://voice.fub.il/conferences/2008_langtech/en/technical_program/fp/30_Bourlard.pdf; 8 pages.
(Continued)

*Primary Examiner* — Marcus T Riley
(74) *Attorney, Agent, or Firm* — Powell IP Law, PLLC

(57) ABSTRACT

Systems and methods, and computer-readable media bearing instructions for carrying out methods of capturing notes from passive recording of an ongoing content stream and annotating the note with a category are presented. Passive recording comprises temporarily recording the most recent content of the ongoing content stream. An ongoing content stream is passively recorded in a passive recording buffer. The passive recording buffer is configured to store a limited amount of recorded content corresponding to the most recently recorded content of the ongoing content stream. Upon indication by the user, a note is generated from the recorded content in the passive recording, annotated with a category, and stored in a note file for the user.

20 Claims, 9 Drawing Sheets

Related U.S. Application Data

(60) Provisional application No. 62/186,313, filed on Jun. 29, 2015.

(51) Int. Cl.
*G10L 15/26* (2006.01)
*G11B 20/10* (2006.01)
*G11B 27/031* (2006.01)

(52) U.S. Cl.
CPC .. *G11B 27/031* (2013.01); *G11B 2020/10546* (2013.01); *G11B 2020/10629* (2013.01)

(56) References Cited

U.S. PATENT DOCUMENTS

| | | | |
|---|---|---|---|
| 6,452,615 | B1 | 9/2002 | Chiu et al. |
| 6,463,413 | B1 | 10/2002 | Applebaum et al. |
| 6,567,503 | B2 | 5/2003 | Engelke et al. |
| 6,640,145 | B2* | 10/2003 | Hoffberg ............ G05B 19/0426 700/17 |
| 6,687,671 | B2 | 2/2004 | Gudorf et al. |
| 6,760,696 | B1 | 7/2004 | Goldberg et al. |
| 7,006,881 | B1* | 2/2006 | Hoffberg ................ G05B 15/02 700/17 |
| 7,260,278 | B2 | 8/2007 | Zhang et al. |
| 7,296,218 | B2 | 11/2007 | Dittrich |
| 7,298,930 | B1 | 11/2007 | Erol et al. |
| 7,466,334 | B1 | 12/2008 | Baba |
| 7,542,971 | B2 | 6/2009 | Thione et al. |
| 7,689,712 | B2 | 3/2010 | Lee et al. |
| 7,693,717 | B2 | 4/2010 | Kahn et al. |
| 7,770,116 | B2 | 8/2010 | Zhang et al. |
| 7,962,525 | B2 | 6/2011 | Kansal |
| 8,243,902 | B2 | 8/2012 | Caspi et al. |
| 8,266,534 | B2 | 9/2012 | Curtis et al. |
| 8,276,077 | B2 | 9/2012 | Segal et al. |
| 8,306,819 | B2 | 11/2012 | Liu et al. |
| 8,380,040 | B2 | 2/2013 | Carter et al. |
| 8,407,049 | B2 | 3/2013 | Cromack et al. |
| 8,433,751 | B2 | 4/2013 | Burns et al. |
| 8,533,192 | B2 | 9/2013 | Moganti et al. |
| 8,589,782 | B2 | 11/2013 | Schachter |
| 8,645,182 | B2 | 2/2014 | Johnson et al. |
| 8,731,919 | B2 | 5/2014 | George |
| 8,768,705 | B2 | 7/2014 | Sundararaman et al. |
| 8,792,863 | B2 | 7/2014 | De Oliveira et al. |
| 8,805,929 | B2 | 8/2014 | Erol et al. |
| 8,909,022 | B1* | 12/2014 | Kasten .................... H04N 5/772 386/227 |
| 2003/0163321 | A1 | 8/2003 | Maull |
| 2004/0153969 | A1 | 8/2004 | Rhodes |
| 2004/0202453 | A1 | 10/2004 | Iggulden |
| 2006/0047816 | A1 | 3/2006 | Lawton et al. |
| 2007/0127887 | A1* | 6/2007 | Yap ...................... G11B 27/031 386/230 |
| 2007/0282660 | A1 | 12/2007 | Forth |
| 2008/0022201 | A1 | 1/2008 | Chen |
| 2009/0037171 | A1* | 2/2009 | McFarland ............. G10L 15/26 704/235 |
| 2009/0244278 | A1 | 10/2009 | Taneja et al. |
| 2011/0099006 | A1 | 4/2011 | Sundararaman et al. |
| 2011/0288863 | A1 | 11/2011 | Rasmussen |
| 2012/0036451 | A1 | 2/2012 | Wang et al. |
| 2012/0110082 | A1* | 5/2012 | Brown ............... G06F 17/30731 709/204 |
| 2012/0221365 | A1 | 8/2012 | Maeda |
| 2012/0245936 | A1 | 9/2012 | Treglia |
| 2013/0018654 | A1 | 1/2013 | Toebes |
| 2013/0191719 | A1 | 7/2013 | Underhill et al. |
| 2013/0204618 | A1 | 8/2013 | Henry et al. |
| 2013/0325972 | A1 | 8/2013 | Boston et al. |
| 2013/0294594 | A1 | 11/2013 | Chervets et al. |
| 2013/0329868 | A1 | 12/2013 | Midtun et al. |
| 2014/0089415 | A1 | 3/2014 | Huang et al. |
| 2014/0163974 | A1 | 6/2014 | Carraux et al. |
| 2014/0200944 | A1 | 7/2014 | Henriksen et al. |
| 2014/0272821 | A1 | 9/2014 | Pitschel et al. |
| 2014/0278377 | A1 | 9/2014 | Peters et al. |
| 2014/0278413 | A1 | 9/2014 | Pitschel et al. |
| 2014/0372114 | A1 | 12/2014 | LeBeau et al. |
| 2015/0006546 | A1 | 1/2015 | Tripi |
| 2015/0046367 | A1 | 2/2015 | Libin et al. |
| 2015/0067026 | A1 | 3/2015 | Christiansen et al. |
| 2016/0292141 | A1* | 10/2016 | Liu ........................ G06F 17/241 |
| 2016/0292897 | A1* | 10/2016 | Gabor ..................... G06F 3/165 |

OTHER PUBLICATIONS

Romej, Steven, "Meetings—Notebooks for Work—Meeting Notes, Agendas, and Minutes", Published on:Mar. 9, 2014, Available at: https://itunes.apple.com/us/app/meetings-notebooks-for-work/id480510692?mt=8, 2 pages.

"Meeting Notes Blueprint", Retrieved on: Jun. 3, 2015, Available at: https://confluence.atlassian.com/display/DOC/Meeting+Notes+Blueprint; 12 pages.

"Lucid Meetings Integrates Collaboration and Web Conferencing Solutions for Better Meetings", Published on: Mar. 30, 2012, Available at: http://theapptimes.com/lucid-meetings-integrates-collaboration-and-web-conferencing-solutions-for-better-meetings/, 10 pages.

"Run Effective Meetings", Published on: Aug. 1, 2013, Available at: http://www.meetingbooster.com/run-effective-meetings.php, 4 pages.

"Recordium Pro-Voice Recorder, Record Memos and Note Taking", Apr. 22, 2015, Available at: https://itunes.apple.com/us/app/recordium-highlight%20annotate/id637494062?mt=8, 3 pages.

"The Sonocent Guide to Recording Devices", Retreived on: Apr. 22, 2015, Available at: http://downloads.audionotetaker.com/guide_to_recording_devices.pdf. 16 pages.

"Cogi", Retrieved on: Apr. 27, 2015, Available at: https://cogi.com/#/, 6 pages.

Kendrick, James, "Coolest technology—OneNote Audio Recording Synchronized", Sep. 2, 2008, Available at: https://gigaom.com/2008/09/02/coolest-technol/, 3 pages.

"How to use FAVE-align", Mar. 23, 2012, Available at: http://fave.ling.upenn.edu/usingFAAValign.html, 4 pages.

"Evernote Knowledge Base—How to record audio into Evernote", Retrieved on: Apr. 29, 2015 Available at: https://evernote.com/contacl/support/kb/#!/article/28606837, 2 pages.

Tur, et al., "The CALO Meeting Assistant System", In Proceedings of IEEE Transactions on Audio, Speech, and Language Processing, vol. 18, Issue 6, Aug. 2010, pp. 1601-1611.

Bradley, Tony, "5 cool OneNote features you're probably not using", Available at: http://www.pcworld.com/article/2092277/5-cool-onenote-features-youre-probably-not-using.html, PCWorld, Feb. 4, 2014, 5 pages.

"Record audio and video notes", Available at: https://support.office.com/en-us/article/Record-audio-and-video-notes-b90fa4a2-253b-47ec-99bd-c9b368268465, Retrieved on Apr. 22, 2015, 3 pages.

Pratley, Chris, "Audio Trascriptions and Annotations with OneNote", Published on: Mar. 16, 2006, Available at: http://blogs.msdn.com/b/chris_pratley/archive/2006/03/16/audio-transcriptions-and-annotations-with-onenote.aspx.

"International Search Report & Written Opinion Received for PCT Application No. PCT/US2016/025106", dated Jul. 7, 2016, 12 Pages.

"International Search Report and Written Opinion Issued in PCT Application No. PCT/US2016/025461", dated Jul. 11, 2016, 13 Pages.

International Search Report and Written Opinion Issued in PCT Application No. PCT/US2016/025463, dated Jul. 20, 2016, 14 Pages.

"International Search Report and Written Opinion Issued in PCT Application No. PCT/US2016/025464", dated Jul. 7, 2016, 12 Pages.

Wylie, Jonathan., "10 Reasons Why OneNote is the Ultimate Note Taking Tool for Schools", Published on: Jun. 29, 2014 Available at:

(56) References Cited

OTHER PUBLICATIONS http://jonathanwylie.com/2014/06/29/10-reasons-why-onenote-is-the-ultimate-note-taking-tool-for-schools.
"Livescribe+ App", Retrieved on: Apr. 22, 2015 Available at: http://www.livescribe.com/en-us/smartpen/ls3/app.html.
"Livescribe Smartpens", Retrieved on: Apr. 22, 2015 Available at: http://www.livescribe.com/en-us/smartpen/.
Lee, Nicole., "Livescribe 3 smartpen digitizes notes straight to your iPad, starts at $150", Published on: Oct. 28, 2013 Available at: http://www.engadget.com/2013/10/28/livescribe-3/.
"Notability", Published on: Mar. 18, 2015 Available at: https://itunes.apple.com/in/app/notability/id360593530?mt=8.
"Audio Notetaker", Published on: Apr. 27, 2013 Available at: http://www.sonocent.com/en/the_software/audio_notetaker.
"Note Taker HD", Retrieved on: Apr. 22, 2015 Available at: https://itunes.apple.com/en/app/note-taker-hd/id366572045?mt=8.
"eLucidate", Published on: Mar. 2005 Available at: http://www.cilip.org.uk/sites/default/files/documents/eLucidate2-2.pdf.
Gatica-Perez, et al., "On Automatic Annotation of Meeting Databases", In Proceedings of International Conference on Image Processing, Sep. 14, 2003, 4 pages.
Bulterman, Dick C.A., "Creating Peer-Level Video Annotations for Web-Based Multimedia", In Proceedings of the Seventh Eurographics conference on Multimedia, Oct. 27, 2004, 9 pages.
"Non-final Office Action from U.S. Appl. No. 14/678,611", dated Nov. 18, 2016, 9 pages.
"Non-final Office Action from U.S. Appl. No. 14/838,849", dated Nov. 22, 2016, 9 pages.
"Non-final Office Action from U.S. Appl. No. 14/859,291", dated Dec. 2, 2016, 7 pages.
"Non-final Office Action from U.S. Appl. No. 14/874,663", dated Dec. 12, 2016, 10 pages.
Second Written Opinion Issued in PCT Application No. PCT/US2016/025106, dated Mar. 3, 2017, 7 pages.
"Second Written Opinion Issued in PCT Application No. PCT/US2016/025464", dated Mar. 2, 2017, 8 Pages.
"International Search Report from PCT Patent Application No. PCT/US2016/039697", dated Nov. 18, 2016, 3 pages.
"International Search Report and Written Opinion Issued in PCT Application No. PCT/US2016/039695", dated Nov. 2, 2016, 13 Pages.
International Preliminary Report on Patentability Issued in PCT Application No. PCT/US2016/025106; dated Jun. 22, 2017; 8 pages.
International Preliminary Report on Patentability Issued in PCT Application No. PCT/US2016/025461; dated Jun. 23, 2017; 9 pages.
International Preliminary Report on Patentability Issued in PCT Application No. PCT/US2016/025463; dated Jul. 21, 2017; 7 pages.
U.S. Appl. No. 14/678,611—Final Office Action dated May 24, 2017, 10 pages.
Second Written Opinion Issued in PCT Application No. PCT/US2016/025461, dated Mar. 23, 2017, 9 pages.
U.S. Appl. No. 14/838,849, Final Office Action dated Jul. 20, 2017, 9 pages.
Second Written Opinion issued in PCT Application No. PCT/US2016/025463, dated May 22, 2017, 8 pages.
U.S. Appl. No. 14/859,291—Final Office Action, dated Jul. 19, 2017, 8 pages.
PCT/US2016/039697—Written Opinion of the International Preliminary Examining Authority, dated May 31, 2017, 6 pages.
U.S. Appl. No. 14/874,663, Final Office Action, dated Aug. 2, 2017, 10 pages.
"International Preliminary Report on Patentability Issued in PCT Application No. PCT/US2016/025464", dated Jun. 22, 2017, 9 Pages.
"Second Written Opinion Issued in PCT Application No. PCT/US2016/039695", dated May 23, 2017, 7 Pages.
"International Preliminary Report on Patentability Issued in PCT Application No. PCT/US2016/039695", dated Sep. 11, 2017, 8 Pages.

* cited by examiner

ANNOTATING NOTES FROM PASSIVE RECORDING WITH CATEGORIES

CROSS-REFERENCE TO RELATED APPLICATIONS

This application is a continuation-in-part of U.S. patent application Ser. No. 14/678,611, titled "Generating Notes From Passive Recording," filed Apr. 3, 2015, which is incorporated herein by reference. This application further claims priority to U.S. Provisional Patent Application No. 62/186,313, titled "Generating Notes From Passive Recording With Annotations," filed Jun. 29, 2015, which is incorporated herein by reference. This application is related to co-pending U.S. patent application Ser. No. 14/838,849, titled "Annotating Notes From Passive Recording With User Data," filed Aug. 28, 2015.

BACKGROUND

As most everyone will appreciate, it is very difficult to take handwritten notes while actively participating in an on-going conversation or lecture, whether or not one is simply listening or activity conversing with others. At best, the conversation becomes choppy as the note-taker must pause in the conversation (or in listening to the conversation) to commit salient points of the conversation to notes. Quite often, the note taker misses information (which may or may not be important) while writing down notes of a previous point. Typing one's notes does not change the fact that the conversation becomes choppy or the note taker (in typing the notes) will miss a portion of the conversation.

Recording an entire conversation and subsequently replaying and capturing notes during the replay, with the ability to pause the replay while the note taker captures information to notes, is one alternative. Unfortunately, this requires that the note taker invests the time to re-listen to the entire conversation to capture relevant points to notes.

Most people don't have an audio recorder per se, but often possess a mobile device that has the capability to record audio. While new mobile devices are constantly updated with more computing capability and storage, creating an audio recording of a typical lecture would consume significant storage resources.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods, and computer-readable media bearing instructions for carrying out methods of capturing notes from passive recording of an ongoing content stream and annotating the note with a category are presented. Passive recording comprises temporarily recording the most recent content of the ongoing content stream. An ongoing content stream is passively recorded in a passive recording buffer. The passive recording buffer is configured to store a limited amount of recorded content corresponding to the most recently recorded content of the ongoing content stream. Upon indication by the user, a note is generated from the recorded content in the passive recording, annotated with a category, and stored in a note file for the user.

According to additional aspects of the disclosed subject matter, a computer-implemented method conducted on a user's computing device for generating notes from an ongoing content stream is presented. The method comprises initiating passive recording of an ongoing content stream, where the passive recording stores recorded content of the ongoing content stream in a passive recording buffer. A user indication to generate a note based on the recorded content of the passive recording of the ongoing content stream is then received. In response to receiving the user indication to generate a note, a note is generated from the recorded content of the passive recording and the note is the stored in a note file. An indication to associate a category with the generated note is received from the user and the generated note is annotated with the category in the note file.

According to further aspects of the disclosed subject matter, a computer-readable medium bearing computer-executable instructions is presented. When the computer-executable instructions are executed on a computing system comprising at least a processor, the execution carries out a method for generating notes annotated with a category from an ongoing content stream. The method comprises at least initiating passive recording of the ongoing content stream, where the passive recording is stored in a passive recording buffer. A user indication to generate a note based on the recorded content of the passive recording of the ongoing content stream is received. A user indication to associate a category of a plurality of predetermined categories with the generated note is also received. A note is generated from the ongoing content stream from the recorded content of the passive recording. The generated note is then annotated with the category in the note file and the annotated note is stored in a note file in association with an event corresponding to the ongoing content stream.

According to still further aspects of the disclosed subject matter, a computing device for generating annotated notes from an ongoing content stream is presented. The computing device comprises a processor and a memory, where the processor executes instructions stored in the memory as part of or in conjunction with additional components to generate notes from an ongoing content stream. These additional components include at least a passive recording buffer, an audio recording component, a passive recording component, an annotation component, and a note generator component. In operation, the audio recording component records content of the ongoing content stream and the passive recording component obtains the recorded content of the ongoing content stream from the audio recording component and stores the recorded content to the passive recording buffer. The annotation component is configured to annotate a generated note with a category in conjunction with the note generator component. The note generator component initiates a passive recording process via the passive recording component. Further, the note generator component receives an indication from the user, via a user interface component, to capture the recorded content of the ongoing content stream, generate a note from the captured recorded content, annotate the generated note with a category via the annotation component, and store generated note in a note file in a data store.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1A:
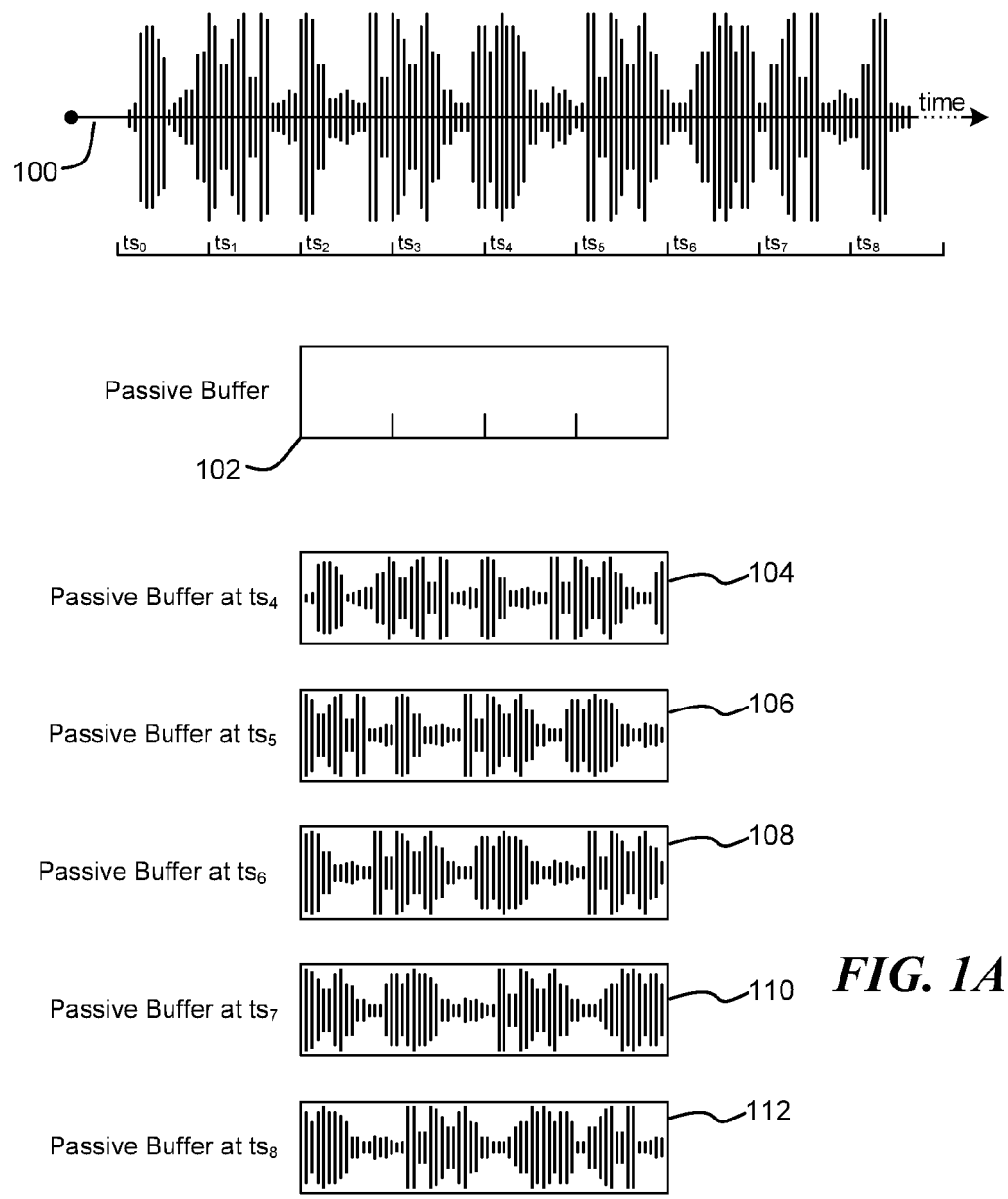
FIG. 1A illustrate an exemplary audio stream (i.e., ongoing audio conditions) with regard to a time line, and further illustrates various the ongoing passive recording of the audio stream into an exemplary passive recording buffer.

For purposes of clarity, the term "exemplary," as used in this document, should be interpreted as serving as an illustration or example of something, and it should not be interpreted as an ideal and/or a leading illustration of that thing.

For purposes of clarity and definition, the term "content stream" or "ongoing content stream" should be interpreted as being an ongoing occasion in which audio and/or audio visual content can be sensed and recorded. Examples of an ongoing content stream include, by way of illustration and not limitation: a conversation; a lecture; a monologue; a presentation of a recorded occasion; and the like. In addition to detecting a content stream via audio and/or audio/visual sensors or components, according to various embodiments the ongoing content stream may correspond to a digitized content stream which is being receives, as a digital stream, by the user's computing device.

The term "passive recording" refers to an ongoing recording of a content stream. Typically, the content stream corresponds to ongoing, current audio or audio/visual conditions as may be detected by condition sensing device such as, by way of illustration, a microphone. For purposed of simplicity of this disclosure, the description will generally be made in regard to passively recording audio content. However, in various embodiments, the ongoing recording may also include both visual content with the audio content, as may be detected by an audio/video capture device (or devices) such as, by way of illustration, a video camera with a microphone, or by both a video camera and a microphone. The ongoing recording is "passive" in that a recording of the content stream is only temporarily made; any passively recorded content is overwritten with more recent content of the content stream after a predetermined amount of time. In this regard, the purpose of the passive recording is not to generate an audio or audio/visual recording of the content stream for the user, but to temporarily store the most recently recorded content in the event that, upon direction by a person, a transcription to text of the most recently recorded content may be made and stored as a note for the user.

In passively recording the current conditions, e.g., the audio and/or audio/visual conditions, the recently recorded content is placed in a "passive recording buffer." In operation, the passive recording buffer is a memory buffer in a host computing device configured to hold a limited, predetermined amount of recently recorded content. For example, in operation the passive recording buffer may be configured to store a recording of the most recent minute of the ongoing audio (or audio/visual) conditions as captured by the recording components of the host computing device. To further illustrate aspects of the disclosed subject matter, particularly in regard to passive recording and the passive recording buffer, reference is made to FIG. 1.

FIG. 1 illustrate an exemplary audio stream 102 (i.e., ongoing audio conditions) with regard to a time line 100, and further illustrates various the ongoing passive recording of the audio stream into an exemplary passive recording buffer. According to various embodiments of the disclosed subject matter and shown in FIG. 1, the time (as indicated by time line 100) corresponding to the ongoing audio stream 102 may be broken up according to time segments, as illustrated by time segments $ts_0$-$ts_8$. While the time segments may be determined according to implementation details, in one non-limiting example the time segment corresponds to 15 seconds. Correspondingly, the passive recording buffer, such as passive recording buffer 102, may be configured such that it can store a predetermined amount of recently recorded content, where the predetermined amount corresponds to a multiple of the amount of recently recorded content that is recorded during a single time segment. As illustratively shown in FIG. 1, the passive recording buffer 102 is configured to hold an amount of the most recently recorded content corresponding to 4 time segments though, as indicted about, this number may be determined according to implementation details and/or according to user preferences.

Conceptually, and by way of illustration and example, with the passive recording buffer 102 configure to temporarily store recently recorded content corresponding to 4 time segments, the passive recording buffer 102 at the beginning of time segment $ts_4$ will include the recently recorded content from time segments $ts_0$-$ts_3$, as illustrated by passive recording buffer 104. Similarly, the passive recording buffer 102, at the start of time period $ts_5$, will include the recently recorded content from time segments $ts_1$-$ts_4$, and so forth as illustrated in passive recording buffers 106-112.

In regard to implementation details, when the recently recorded content is managed according to time segments of content, as described above, the passive recording buffer can implemented as a circular queue in which the oldest time segment of recorded content is overwritten as a new time segment begins. Of course, when the passive recording buffer 102 is implemented as a collection of segments of content (corresponding to time segments), the point at which a user provides an instruction to transcribe the contents of the passive recording buffer will not always coincide with a time segment. Accordingly, an implementation detail, or a user configuration detail, can be made such that recently recorded content of at least a predetermined amount of time is always captured. In this embodiment, if the user (or implementer) wishes to record at least 4 time segments of content, the passive recording buffer may be configured to hold 5 time segments worth of recently recorded content.

Figure 1B:
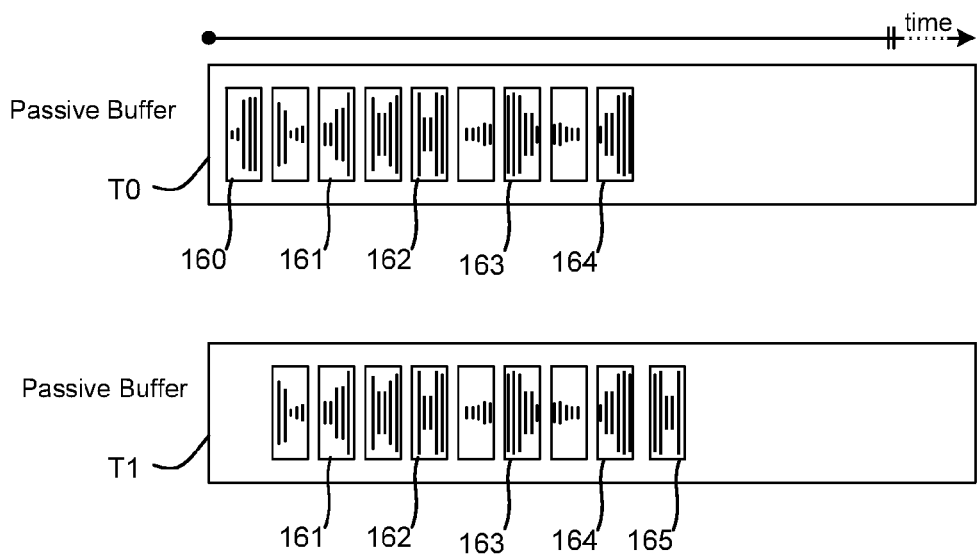
FIG. 1B illustrates component with regard to an alternative implementation (to that of FIG. 1A) in conducting the ongoing passive recording of an audio stream into a passive recording buffer.

While the discussion above in regard to FIG. 1A is made in regard to capturing recently recording content along time segments, it should be appreciated that this is one manner in which the content may be passively recorded. Those skilled in the art will appreciate that there are other implementation methods in this an audio or audio/visual stream may be passively recorded. Indeed, in an alternative embodiment as shown in FIG. 1B, the passive recording buffer is configured to a size sufficient to contain a predetermined maximum amount of passively recorded content (as recorded in various frames) according to time. For example, if the maximum amount (in time) of passively recorded content is 2 minutes, then the passive recording buffer is configured to retain a sufficient number of frames, such as frames 160-164, which collectively correspond to 2 minutes. Thus, as new frames are received (in the on-going passive recording), older frames whose content falls outside of the preceding amount of time for passive recording will be discarded. In reference to passive buffer T0, assuming that the preceding amount of time to passively record is captured in 9 frames (as shown in passive buffer T0), when a new frame 165 is received, it is stored in the passive buffer and the oldest frame 160 is discarded, as shown in passive buffer T1.

While the passive recording buffer may be configured to hold a predetermined maximum amount of recorded content, independent of the maximum amount that a passive recording buffer can contain and according to various embodiments of the disclosed subject matter, a computer user may configure the amount of recent captured content to be transcribed and placed as a note in a note file—of course, constrained by the maximum amount of content (in regard to time) that the passive recording buffer can contain. For example, while the maximum amount (according to time) of passively recorded content that passive recording buffer may contain may be 2 minutes, in various embodiments the user is permitted to configure the length (in time) of passive recorded content to be converted to a note, such as the prior 60 seconds of content, the prior 2 minutes, etc. In this regard, the user configuration as to the length of the audio or audio/visual content stream to be transcribed and stored as a note in a note file (upon user instruction), is independent of the passive recording buffer size (except for the upper limit of content that can be stored in the buffer.) Further, while the example above suggests that the passive recording buffer may contain up to 2 minutes of content, this is merely illustrative and should not be construed as limiting upon the disclosed subject matter. Indeed, in various alternative, non-limiting embodiments, the passive recording buffer may be configured to hold up to any one of 5 minutes of recorded content, 3 minutes of recorded content, 90 seconds of recorded content, etc. Further, the size of the passive recording buffer may be dynamically determined, adjusted as needed according to user configuration as to the length of audio content to be converted to a note in a note file.

Rather than converting the frames (160-165) into an audio stream at the time that the frames are received and stored in the passive buffer, the frames are simply stored in the passive buffer according to their sequence in time. By not processing the frames as they are received but, instead, processing the frames into an audio stream suitable for transcription (as will be described below), significant processing resources may be conserved. However, upon receiving an indication that the content in the passive buffer is to be transcribed into a note, the frames are merged together into an audio (or audio/visual) stream that may be processed by a transcription component or service.

As shown with regard to FIGS. 1A and 1B, there may be any number of implementations of a passive buffer, and the disclosed subject matter should be viewed as being equally applicable to these implementations. Indeed, irrespective of the manner in which a passive buffer is implemented, what is important is that a predetermined period of preceding content is retained and available for transcription at the direction of the person using the system.

Figure 2:
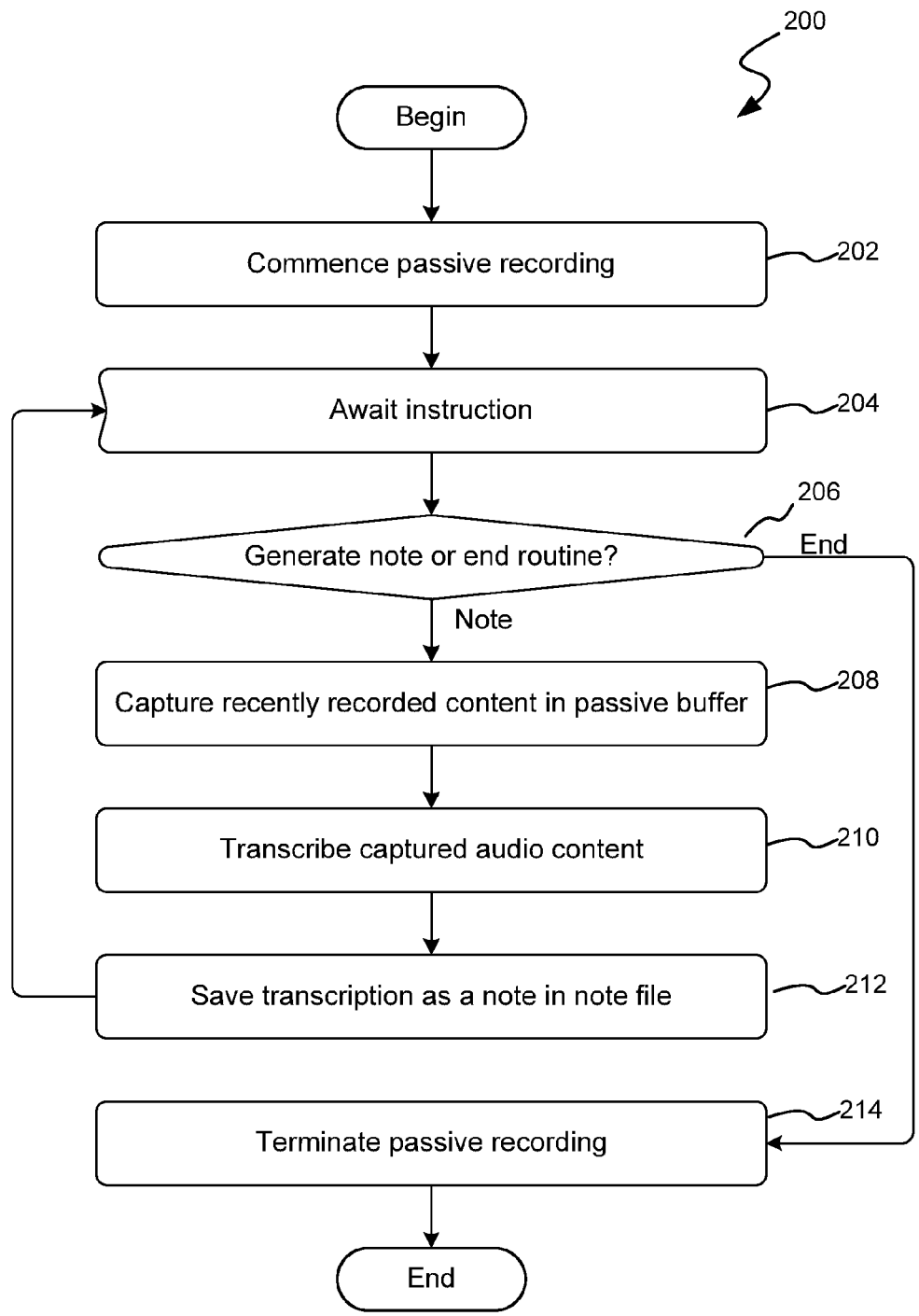
FIG. 2 is a flow diagram illustrating an exemplary routine for generating notes of the most recently portion of the ongoing content stream.

As briefly discussed above, with an ongoing audio stream (or audio/visual stream) being passively recorded, a person (i.e., user of the disclosed subject matter on a computing device) can cause that the most recently recorded content of the ongoing stream be transcribed to text and the transcription recorded in a notes file. FIG. 2 is a flow diagram illustrating an exemplary routine 200 for generating notes, i.e., a textual transcription of the recently recorded content, of the most recently portion of the ongoing audio stream. Beginning at block 202, a passive recording process of the ongoing audio stream is commenced. As should be understood, this passive recording is an ongoing process and continues recording the ongoing audio (or audio/visual) stream (i.e., the content stream) until specifically terminated at the direction of the user, irrespective of other steps/activities that are taken with regard to routine 200. With regard to the format of the recorded content by the passive recording process, it should be appreciated that any suitable format may be used including, by way of illustration and not limitation, MP3 (MPEG-2 audio layer III), AVI (Audio Video Interleave), AAC (Advanced Audio Coding), WMA (Windows Media Audio), WAV (Waveform Audio File Format), and the like. Typically though not exclusively, the format of the recently recorded content is a function of the codec (coder/decoder) that is used to convert the audio content to a file format.

At block 204, with the passive recording of the content stream ongoing, the routine 200 awaits a user instruction. After receiving a user instruction, at decision block 206 a determination is made as to whether the user instruction is in regard to generating notes (from the recorded content in the passive recording buffer 102) or in regard to terminating the routine 200. If the instruction is in regard to generating a note, at block 208 the recently recorded content in the passive recording buffer is captured. In implementation, typically capturing the recently recorded content in the passive recording buffer comprises copying the recently recorded content from the passive recording buffer into another temporary buffer. Also, to the extent that the content in the passive recording buffer is maintained as frames, the frames are merged into an audio stream (or audio/visual stream) into the temporary buffer. This copying is done such that the recently recorded content can be transcribed without impacting the passive recording of the ongoing audio stream such that information/content of the ongoing content stream is continuously recorded.

At block 210, after capturing the recently recorded content in the passive recording buffer, the captured recorded content is transcribed to text. According to aspects of the disclosed subject matter, the captured recorded content may be transcribed by executable transcription components (comprising hardware and/or software components) on the user's computing device (i.e., the same device implementing routine 200). Alternatively, a transcription component may transmit the captured recorded content to an online transcription service and, in return, receive a textual transcription of the captured recorded content. As additional alternatives, the captured recorded content may be temporarily stored for future transcription, e.g., storing the captured recorded content for subsequent uploading to a computing device with sufficient capability to transcribe the content, or storing the captured recorded content until a network communication can be established to obtain a transcription from an online transcription service.

At block 212, the transcription is saved as a note in a note file. In addition to the text transcription of the captured recorded content, additional information may be stored with the note in the note file. Information such as the date and time of the captured recorded content may be stored with or as part of the note in the note file. A relative time (relative to the start of routine 200) may be stored with or as part of the note in the note file. Contextual information, such as meeting information, GPS location data, user information, and the like can be stored with or as part of the note in the note file. After generating the note and storing it in the note file, the routine 200 returns to block 204 to await additional instructions.

At some point, at decision block 206, the user instruction/action may be in regard to terminating the routine 200. Correspondingly, the routine 200 proceeds to block 214 where the passive recording of the ongoing audio (or audio/visual) stream is terminated, and the routine 200 terminates.

Figure 3:
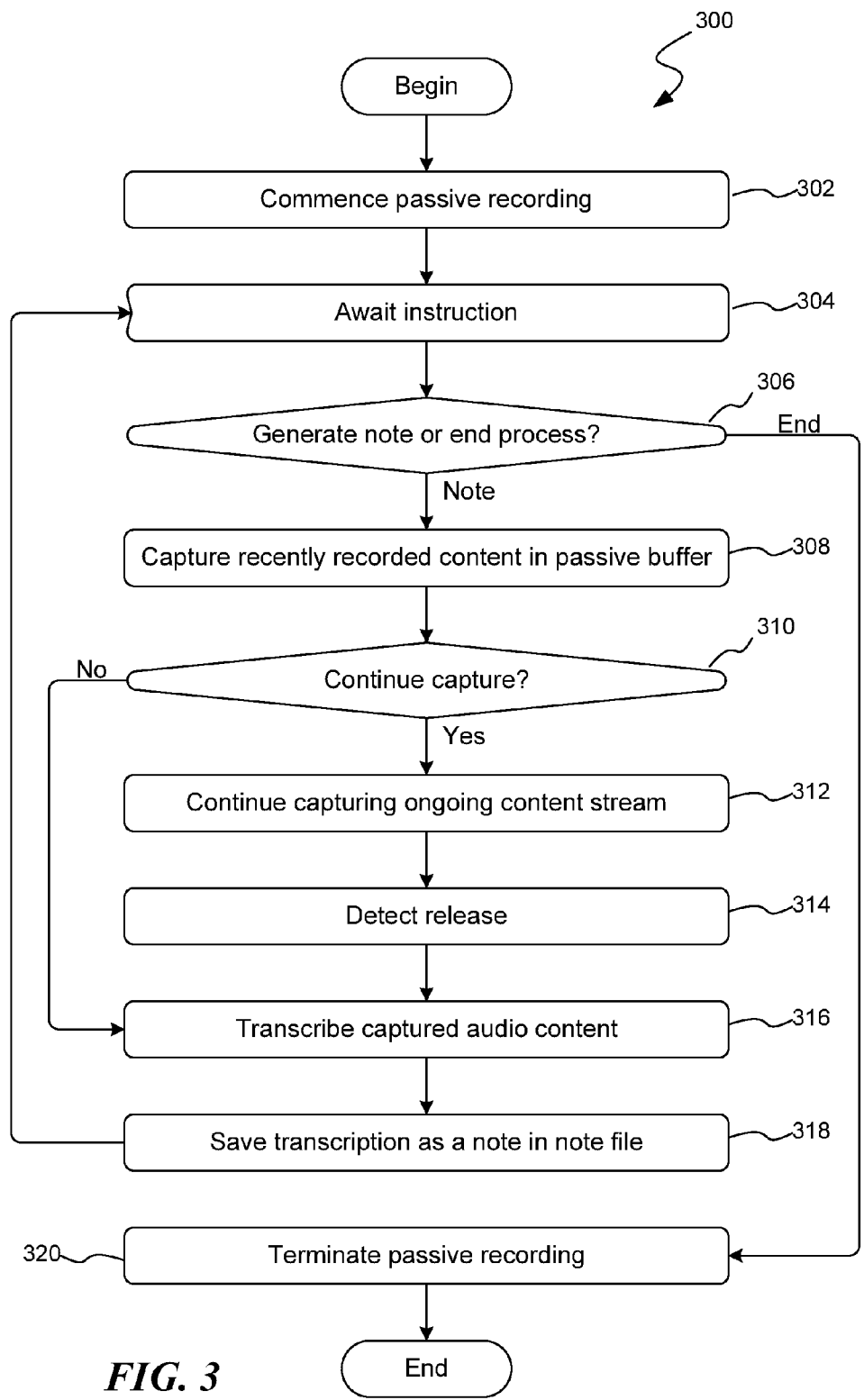
FIG. 3 is a flow diagram illustrating an exemplary routine for generating notes of the most recently portion of the ongoing content stream, and for continued capture until indicated by a user.

Often, an interesting portion of an ongoing conversation/stream may be detected and the user will wish to not only capture notes regarding the most recent time period, but continue to capture the content in an ongoing manner. The disclosed subject matter may be suitably and advantageously implemented to continue capturing the content (for transcription to a text-based note) as described in regard to FIG. 3. FIG. 3 is a flow diagram illustrating an exemplary routine 300 for generating notes of the most recently portion of the ongoing content stream, and for continued capture until indicated by a user. As will be seen, many aspects of routine 200 and routine 300 are the same.

Beginning at block 302, a passive recording process of the ongoing audio stream is commenced. As indicated above in regard to routine 200, this passive recording process is an ongoing process and continues recording the ongoing content stream until specifically terminated, irrespective of other steps/activities that are taken with regard to routine 300. With regard to the format of the recently recorded content, it should be appreciated that any suitable format may be used including, by way of illustration and not limitation, MP3 (MPEG-2 audio layer III), AVI (Audio Video Interleave), AAC (Advanced Audio Coding), WMA (Windows Media Audio), WAV (Waveform Audio File Format), and the like.

At block 304, with the passive recording ongoing, the routine 300 awaits a user instruction. After receiving a user instruction, at decision block 306 a determination is made as to whether the user instruction is in regard to generating a note (from the recorded content in the passive recording buffer 102) or in regard to ending the routine 300. If the user instruction is in regard to generating a note, at block 308 the recently recorded content in the passive recording buffer is captured. In addition to capturing the recorded content from the passive recording buffer, at decision block 310 a determination is made in regard to whether the user has indicated that the routine 300 should continue capturing the ongoing audio stream for transcription as an expanded note. If the determination is made that the user has not indicated that the routine 300 should continue capturing the ongoing audio stream, the routine proceeds to block 316 as described below. However, if the user has indicated that the routine 300 should continue capturing the ongoing audio stream as part of an expanded note, the routine proceeds to block 312.

At block 312, without interrupting the passive recording process, the ongoing recording of the ongoing content stream to the passive recording buffer is continually captured as part of expanded captured recorded content, where the expanded captured recorded content is, thus, greater than the amount of recorded content that can be stored in the passive recording buffer. At block 314, this continued capture of the content stream continues until an indication from the user is received to release or terminate the continued capture. At block 316, after capturing the recently recorded content in the passive recording buffer and any additional content as indicated by the user, the captured recorded content is transcribed to text. As mentioned above in regard to routine 200 of FIG. 2, the captured recorded content may be transcribed by executable transcription components (comprising hardware and/or software components) on the user's computing device. Alternatively, a transcription component may transmit the captured recorded content to an online transcription service and, in return, receive a textual transcription of the captured recorded content. As additional alternatives, the captured recorded content may be temporarily stored for future transcription, e.g., storing the captured recorded content for subsequent uploading to a computing device with sufficient capability to transcribe the content, or storing the captured recorded content until a network communication can be established to obtain a transcription from an online transcription service.

At block 318, the transcription is saved as a note in a note file, i.e., a data file comprising at least one or more text notes. In addition to the text transcription of the captured recorded content, additional information may be stored with the note in the note file. Information such as the date and time of the captured recorded content may be stored with or as part of the note in the note file. A relative time (relative to the start of routine 200) may be stored with or as part of the note in the note file. Contextual information, such as meeting information, GPS location data, user information, and the like can be stored with or as part of the note in the note file. After generating the note and storing it in the note file, the routine 300 returns to block 304 to await additional instructions.

As mentioned above, at decision block 306, the user instruction/action may be in regard to terminating the routine 300. In this condition, the routine 300 proceeds to block 320 where the passive recording of the ongoing audio (or audio/visual) stream is terminated, and thereafter the routine 300 terminates.

Regarding routines 200 and 300 described above, as well as routine 1000 and other processes describe herein, while these routines/processes are expressed in regard to discrete steps, these steps should be viewed as being logical in nature and may or may not correspond to any actual and/or discrete steps of a particular implementation. Also, the order in which these steps are presented in the various routines and processes, unless otherwise indicated, should not be construed as the only order in which the steps may be carried out. In some instances, some of these steps may be omitted. Those skilled in the art will recognize that the logical presentation of steps is sufficiently instructive to carry out aspects of the claimed subject matter irrespective of any particular language in which the logical instructions/steps are embodied.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 4 below. Additionally, in various embodiments all or some of the various routines may also be embodied in executable hardware modules including, but not limited to, system on chips, codecs, specially designed processors and or logic circuits, and the like on a computer system.

These routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed, applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may deliver the computer-executable instructions (and data) to a computing device for execution via various transmission means and mediums including carrier waves and/or propagated signals, for purposes of this disclosure computer readable media expressly excludes carrier waves and/or propagated signals.

Advantageously, many of the benefits of the disclosed subject matter can be conducted on computing devices with limited computing capacity and/or storage capabilities. Further still, many of the benefits of the disclosed subject matter can be conducted on computing devices of limited computing capacity, storage capabilities as well as network connectivity. Indeed, suitable computing devices suitable for implementing the disclosed subject matter include, by way of illustration and not limitation: mobile phones; tablet computers; "phablet" computing devices (the hybrid mobile phone/tablet devices); personal digital assistants; laptop computers; desktop computers; and the like.

Figure 4:
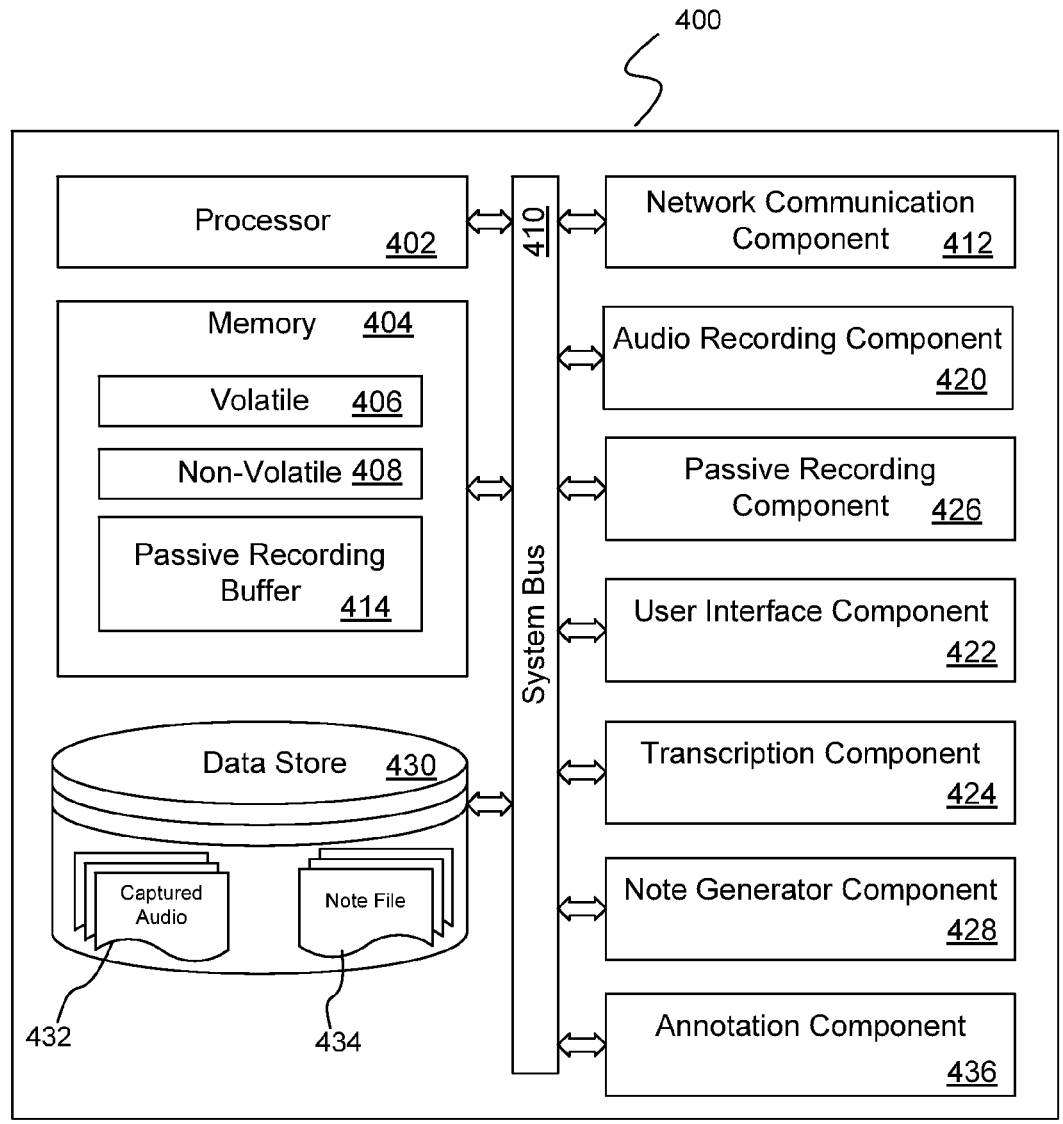
FIG. 4 is a block diagram illustrating exemplary components of a suitably configured computing device for implementing aspects of the disclosed subject matter.

Regarding the various computing devices upon which aspects of the disclosed subject matter may be implemented, FIG. 4 is a block diagram illustrating exemplary components of a suitably configured computing device 400 for implementing aspects of the disclosed subject matter. The exemplary computing device 400 includes one or more processors (or processing units), such as processor 402, and a memory 404. The processor 402 and memory 404, as well as other components, are interconnected by way of a system bus 410. The memory 404 typically (but not always) comprises both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406 whereas ROM, solid-state memory devices, memory storage devices, and/or memory cards are examples of non-volatile memory 408. Also illustrated as part of the memory 404 is a passive recording buffer 414. While shown as being separate from both volatile memory 406 and non-volatile memory 408, this distinction is for illustration purposes in identifying that the memory 404 includes (either as volatile memory or non-volatile memory) the passive recording buffer 414.

Further still, the illustrated computing device 400 includes a network communication component 412 for interconnecting this computing device with other devices over a computer network, optionally including an online transcription service as discussed above. The network communication component 412, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 412, is typically comprised of hardware and/or firmware components (and may also include or comprise executable software components) that transmit and receive digital and/or analog signals over a transmission medium (i.e., the network.)

The processor 402 executes instructions retrieved from the memory 404 (and/or from computer-readable media) in carrying out various functions, particularly in regard to responding to passively recording an ongoing audio or audio/visual stream and generating notes from the passive recordings, as discussed and described above. The processor 401 may be comprised of any of a number of available processors such as single-processor, multi-processor, single-core units, and multi-core units.

The exemplary computing device 400 further includes an audio recording component 420. Alternatively, not shown, the exemplary computing device 400 may be configured to include an audio/visual recording component, or both an audio recording component and a visual recording component, as discussed above. The audio recording component 420 is typically comprised of an audio sensing device, such as a microphone, as well as executable hardware and software, such as a hardware and/or software codec, for converting the sensed audio content into recently recorded content in the passive recording buffer 414. The passive recording component 426 utilizes the audio recording component 420 to capture audio content to the passive recording buffer, as described above in regard to routines 200 and 300. A note generator component 428 operates at the direction of the computing device user (typically through one or more user interface controls in the user interface component 422) to passively capture content of an ongoing audio (or audio/visual) stream, and to further generate one or more notes from the recently recorded content in the passive recording buffer 414, as described above. As indicated above, the note generator component 428 may take advantage of an optional transcription component 424 of the computing device 400 to transcribe the captured recorded content from the passive recording buffer 414 into a textual representation for saving in a note file 434 (of a plurality of note files) that is stored in a data store 430. Alternatively, the note generator component 428 may transmit the captured recorded content of the passive recording buffer 414 to an online transcription service over a network via the network communication component 412, or upload the captured audio content 432, temporarily stored in the data store 430, to a more capable computing device when connectivity is available.

An annotation component is configured to annotate a generated note with one or more annotations, i.e., one or more categories of a plurality of predetermined categories. Annotating a generated note is described in greater detail below in regard to FIGS. 6-9 and 10.

Regarding the data store 430, while the data store may comprise a hard drive and/or a solid state drive separately accessible from the memory 404 typically used on the computing device 400, as illustrated, in fact this distinction may be simply a logical distinction. In various embodiments, the data store is a part of the non-volatile memory 408 of the computing device 400. Additionally, while the data store 430 is indicated as being a part of the computing device 400, in an alternative embodiment the data store may be implemented as a cloud-based storage service accessible to the computing device over a network (via the network communication component 412).

Regarding the various components of the exemplary computing device 400, those skilled in the art will appreciate that these components may be implemented as executable software modules stored in the memory of the computing device, as hardware modules and/or components (including SoCs—system on a chip), or a combination of the two. Moreover, in certain embodiments each of the various components may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

Figure 5:
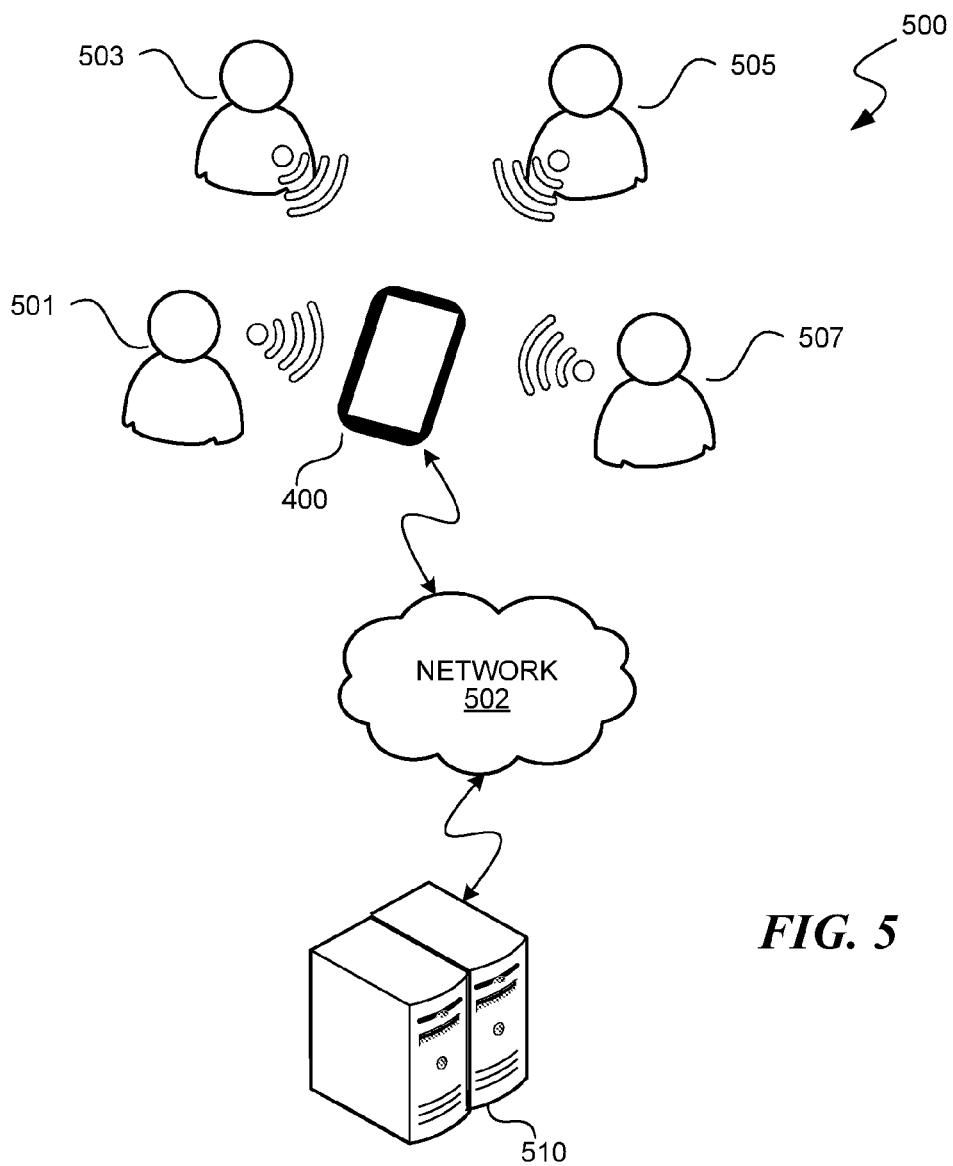
FIG. 5 is a pictorial diagram illustrating an exemplary network environment suitable for implementing aspects of the disclosed subject matter.

FIG. 5 is a pictorial diagram illustrating an exemplary environment 500 suitable for implementing aspects of the disclosed subject matter. As shown in FIG. 5, a computing device 400 (in this example the computing device being a mobile phone of user/person 501) may be configured to passively record an ongoing conversation among various persons as described above, including persons 501, 503, 505 and 507. Upon an indication by the user/person 501, the computing device 400 captures the contents of the passive recording buffer 414, obtains a transcription of the recently recorded content captured from the passive recording buffer, and stores the textual transcription as a note in a note file in a data store. The computing device 400 is connected to a network 502 over which the computing device may obtain a transcription of captured audio content (or audio/visual content) from a transcription service 510, and/or store the transcribed note in an online and/or cloud-based data store (not shown).

In addition to capturing or generating a note of an ongoing content stream, quite often a person may wish to associate additional information with that note. For example, most people have different roles that he/she may take on during any given day including, by way of illustration and not limitation: a personal/familial role; a volunteer role with a child's soccer team; different projects within one's employment, a community service role, and the like. Further, during an on-going conversation, a particular item—captured in a note from the on-going content stream/conversation—may be of particular relevance to a particular aspect of that person's life. In these cases, it would be advantageous to be able to annotate a captured note with a category or tag that can be used to identify a captured note as pertaining to that particular aspect of his/her life.

Still further, while generating a note from an ongoing conversation may capture critical information, locating that a particular note and/or understanding the context of a particular note may be greatly enhanced when the person is able to associate a tag or category with the note, i.e., annotate the captured note. With reference to the examples above, that person may greatly enhance the efficiency by which he/she can recall the particular context of a note and/or identify one or more notes that pertain to a particular aspect of his/her life by associating a tag (or more generally, an annotation) to a generated/captured note.

According to aspects of the disclosed subject matter, during an ongoing recording a person may provide an indication as to a category or tag to be associated with a generated note and an annotation. This indication may be made as part of or in addition to providing an indication to capture and generated a particular note of an ongoing conversation or audio stream as set forth in regard to FIGS. 6-9 and 10. Indeed, FIGS. 6-9 illustrate an exemplary interaction with a computing device executing an application for capturing notes from an on-going audio conversation, and further illustrating the annotation of a captured note with a category or tag. FIG. 10 illustrates an exemplary routine 1000 for generating notes of the most recently passively recorded content of the ongoing content stream, for continued capture until indicated by a user, and for annotating the captured note with a predetermined category or tag.

With regard to FIGS. 6-9, FIG. 6 illustrates a typical home screen as presented by an app (or application) executing on a computing device 600. The home screen illustrates/includes several meeting entries, such as meeting entries 602 and 604, for which the user of the computing device has caused the application to capture notes from an on-going conversation. In this regard, meetings are used as an organizational tool for providing a type of folder in which captured notes can be grouped together. As can be seen, meeting 602 entitled "PM Meeting," which occurred on "7/27/2015" at "10:31 AM," includes two captured notes. Similarly, meeting 604 entitled "Group Mtg," occurred on 7/28/2015 at 1:30 PM and includes 3 captured notes.

In addition to listing the "meetings" (which is more generically used as a folder for collecting generated notes of an on-going audio stream), a user may also create a new meeting (or folder) by interacting with the "add meeting" control 606. Thus, if the user is attending a new meeting and wishes to capture (or may wish to capture) notes from the conversation of the meeting, the user simply interacts with the "add meeting" control 606.

Figure 6:
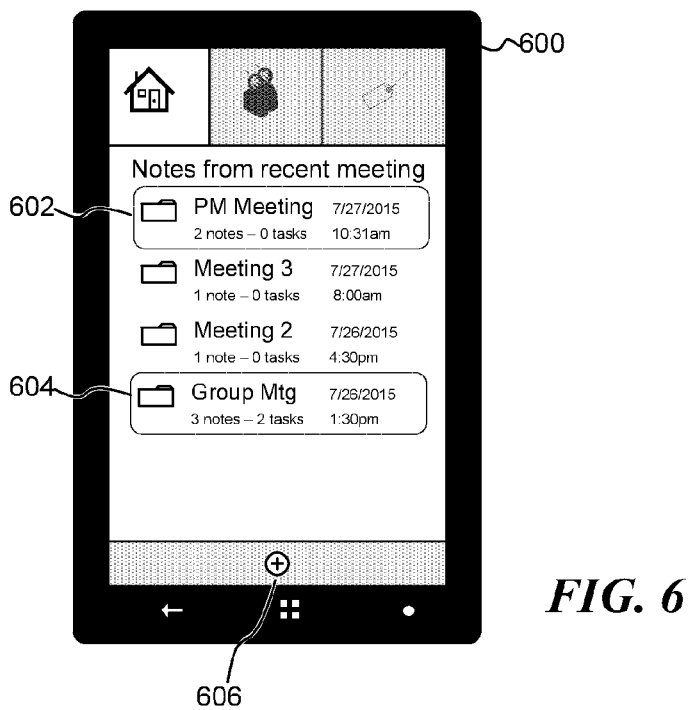
FIG. 6 illustrates a typical home screen as presented by an app (or application) executing on a suitably configured computing device.
Figure 7:
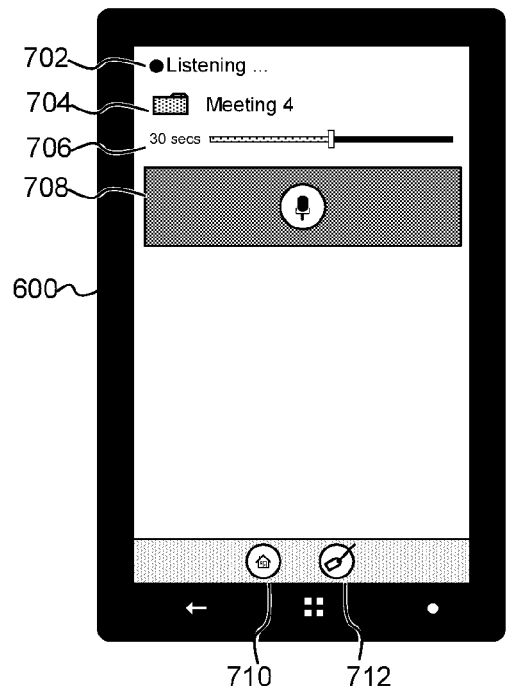
FIG. 7 illustrates the exemplary computing device of FIG. 6 after the user has interacted with the "add meeting" control.

Turning to FIG. 7, FIG. 7 illustrates the exemplary computing device 600 of FIG. 6 after the user has interacted with the "add meeting" control 606. According to one embodiment of the disclosed subject matter, as part of creating a new meeting, the note capturing app executing on the computing device 600 begins its process of passively recording the on-going content stream, as indicated by the status indicator 702. In addition to the status indicator, a meeting title 704 is also displayed, indicating a default title for the new meeting. Of course, in various embodiments, the default title of the meeting may be user configurable to something meaningful to the user, or be obtained from the user's calendar (i.e., a meeting coinciding with the current time). Also shown by the app on the computing device 600 is a duration control 706 by which the user can control the amount/duration (as a function of seconds) of content that is captured in the passive recording buffer, as described above. In the present example, the amount of content, in seconds, that is captured in the passive recording buffer is set at 30 seconds, i.e., 30 seconds worth of content is captured in the passive recording buffer.

Also shown in FIG. 7 is a capture button 708. According to aspects of the disclosed subject matter, by interacting with the capture button 708, the user can cause the underlying app to capture/generate a note from the passive recording buffer and store the note, in conjunction with the meeting, in a note file as described above. Indeed, as also described, through continued interaction with the capture button 708, such as continuing to press on the capture button 708, the amount of content that is captured in the currently captured/generated note is extended until the interaction ceases, thereby extending the amount of content that is captured in a note. Also presented on the computing device 600 is a home control 710 that causes the passive recording to cease and returns to home page (as illustrated in FIG. 6), and a category toggle control 712 that switches from "typical" note capturing to annotated note capturing as described below.

As mentioned above, in addition to simply capturing a note from the on-going content stream, the user may wish to associate a category or tag with a captured note as an annotation to the note. While a user may annotate an already-captured note with a category or tag after the note has been captured/generated, according to aspects of the disclosed subject matter, a set of predetermined categories may be presented, where each predetermined category is presented as a user-actionable control by which the user can cause the content of the passive recording buffer to be captured and converted into a note in the note file (in association with a meeting) as we as be annotated by the category presented by the user-actionable control. Indeed, by interacting with the category toggle control 712, the user can switch to/from the presentation of categories.

Figure 8:
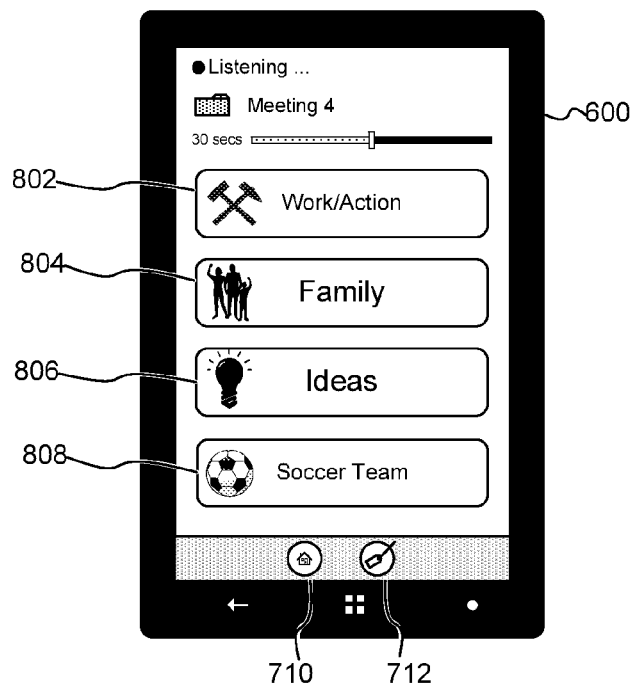
FIG. 8 illustrates the exemplary computing device of FIG. 6 after the user has switched to the presentation of categories as user-actionable controls for capturing the content of the passive recording buffer into a note in the note file and associating the corresponding category with the note as an annotation.

FIG. 8 illustrates the exemplary computing device 600 after the user has switched to the presentation of categories as user-actionable controls for capturing the content of the passive recording buffer into a note in the note file and associating the corresponding category with the note as an annotation. As shown in FIG. 8, the computing device 600 now presents a list of predetermined categories in the form of user-actionable controls, such as user-actionable controls 802-808. Indeed, according to aspects of the disclosed subject matter, by interacting with any one of the user-actionable controls 802-808, a note is generated and stored in the note file, annotated with the category associated with the user-actionable control, and associated with the meeting, or more generically, an "event" corresponding to the ongoing content stream. In other words, the indication to associate the category with a generated note is also an indication to generate a note based on the recorded content of the passive recording of the ongoing content stream. Also shown in FIG. 8 are the home control 710 that causes the passive recording to cease and returns to home page (as illustrated in FIG. 6), and the category toggle control 712 that switches or toggles between "typical" note capturing and "annotated" note capturing.

It should be appreciated and according to various embodiments, while a user may generate a note through interaction with a user-actionable control associated with a category, such as work/action control 802, a user may further configure a generated note to be associated with one or more additional categories. In this manner, a generated note may be associated with multiple categories. Of course, as will be readily appreciated, quite often a particular note is applicable to more than one category. For example, a note that is categorized as a work/action item (as represented by work/action control 802), may also be identifiable and categorized as an idea (as represented by the ideas control 804.) While various embodiments may include the ability to associate multiple categories at the time of generating a note from captured content, in alternative embodiments a user may, after the note is generated, associate one or more categories with the note from a plurality of predetermined categories. Further, while a default set of a plurality of categories may be provided with the application, this set of the plurality of predetermined categories may be user configurable such that the user may add, delete and/or modify the categories.

Figure 9:
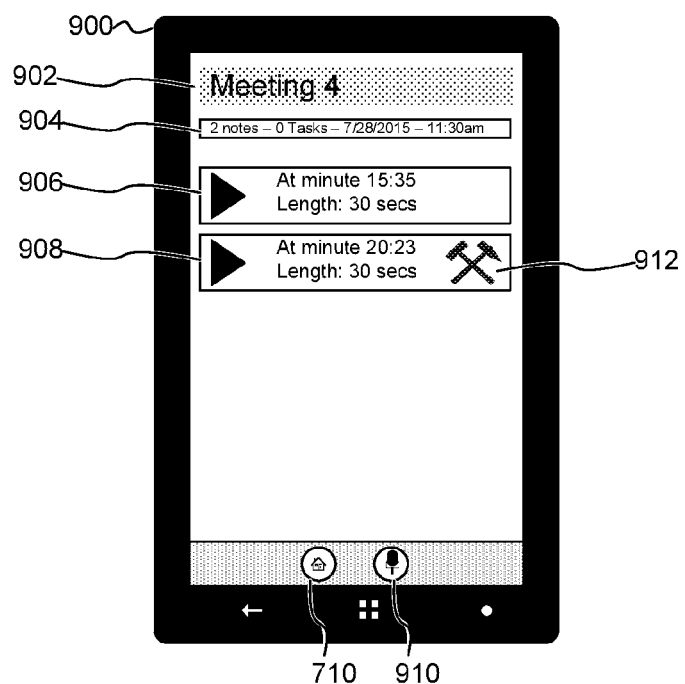
FIG. 9 illustrates the exemplary computing device showing the notes associated with "Meeting 4"
Figure 10:
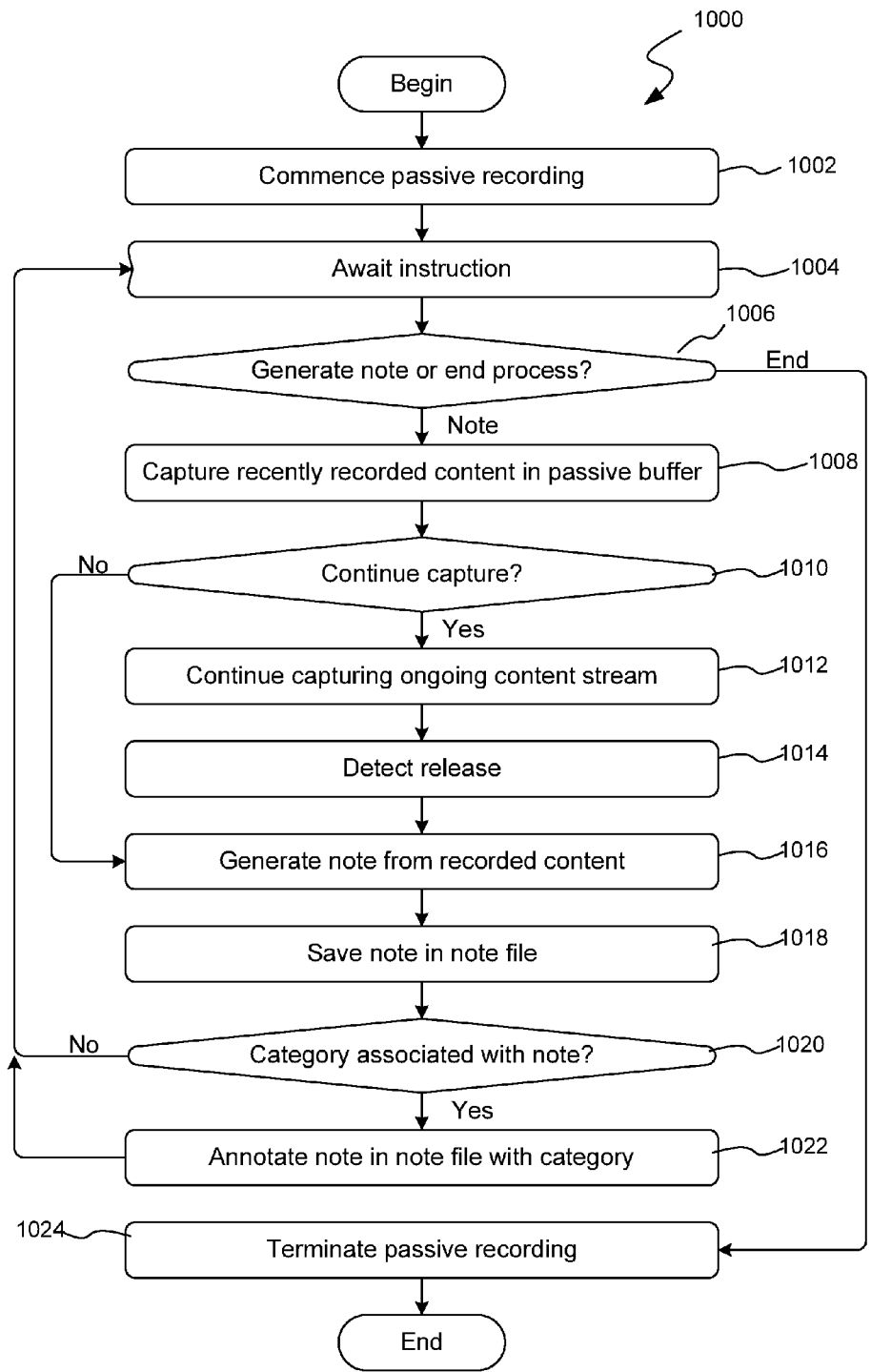
FIG. 10 illustrates an exemplary routine for generating notes of the most recently portion of the ongoing content stream, for continued capture until indicated by a user, and for annotating the captured note with a predetermined category or tag.

Assuming that the user has captured both a non-annotated note and annotated note for the meeting shown in the exemplary FIGS. 6-8, FIG. 9 illustrates the exemplary computing device 600 showing the notes captured and associated with "Meeting 4." Indeed, as shown in FIG. 9, a title control 902 displays the current name of the meeting, a status control 904 illustrates various status information regarding the notes of the meeting, including that there are two (2) notes captured from the meeting, and further includes note 906 and 908, each presented as a user-actionable control for reproducing the note to the user. As can be seen, the first note 906 is not associated with a category (as indicted by the lack of a category icon on the control), whereas note 908 is associated/annotated with a category as indicted by the presence of the category icon 912 (corresponding to the "Work/Action" user-actionable category control 802 of FIG. 8). In addition to the note controls 906 and 908, the computing device 600 also includes a user-actionable record icon 910 that returns to recording notes (either of the screens displayed in FIG. 7 or 8) to continue capturing notes for this meeting.

While FIGS. 6-9 illustrate a particular set of user interfaces for interacting with an app executing on a computing device for capturing notes with a category annotation, it should be appreciated that this is simply one example of such user interaction and should note be viewed as limiting upon the disclosed subject matter. Those skilled in the art will appreciate that there may be any number of user interfaces that may be suitably used by an app to capture a note of an on-going audio stream from a passive recording buffer and associated or annotate the note with a category.

Turning to FIG. 10, FIG. 10 illustrates an exemplary routine 1000 for generating notes of the most recently portion of the ongoing content stream as located in the passive recording buffer as described above, for continued capture until indicated by a user, and for annotating the captured note with a predetermined category or tag. Beginning at block 1002, a passive recording process of the ongoing audio stream is commenced. At block 1004, with the passive recording ongoing, the routine 1000 awaits a user instruction.

After receiving user instruction, at decision block 1006 a determination is made as to whether the user instruction is in regard to generating a note (from the recorded content in the passive recording buffer 102) or in regard to ending the routine 1000. If the user instruction is in regard to generating a note, at block 1008 the recently recorded content in the passive recording buffer is captured. In addition to capturing the recorded content from the passive recording buffer, at decision block 1010 a determination is made in regard to whether the user has indicated that the routine 1000 should continue capturing the ongoing audio stream for transcription as an expanded note. If the determination is made that the user has not indicated that the routine 1000 should continue capturing the ongoing audio stream, the routine proceeds to block 1016 as described below. However, if the user has indicated that the routine 1000 should continue capturing the ongoing audio stream as part of an expanded note, the routine proceeds to block 1012. At block 1012, without interrupting the passive recording process, the ongoing recording of the ongoing content stream to the passive recording buffer is continually captured as part of expanded captured recorded content, where the expanded captured recorded content is, thus, greater than the amount of recorded content that can be stored in the passive recording buffer.

At block 1014, this continued capture of the content stream continues until an indication from the user is received to release or terminate the continued capture. At block 1016, after capturing the recently recorded content in the passive recording buffer and any additional content as indicated by the user, a note is generated from the captured recorded content. According to various embodiments, the note may be generated according to a transcription of the recorded/captured content. Alternatively, a note may be generated as a single audio file from the recorded/captured content. Further still, a note may be stored in a note file in multiple formats, such as an audio file and a transcription.

At block 1018, the generated note is then stored in a note file, i.e., a data file comprising at least one or more text notes. As indicated above, according to various embodiments, the note may be stored in a note file in association with (or as part of) a meeting. At block 1020, a determination is made as to whether a category is to be associated with the generated note, i.e., whether to annotate the note with the category. If the note is not to be annotated with the category, the routine 1000 returns to block 1004 to await additional user instructions. Alternatively, if the generated note is to be annotated with a category, at block 1022 the note is annotated with the category and the routine 1000 returns to block 1004.

As mentioned above, at decision block 1006, the user instruction/action may be in regard to terminating the routine 1000. In this condition, the routine 1000 proceeds to block 1024 where the passive recording of the ongoing audio (or audio/visual) stream is terminated, and thereafter the routine 1000 terminates.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method conducted on a user's computing device, comprising at least a processor and a memory, for generating notes from an ongoing content stream, the method comprising:
    initiating passive recording of an ongoing content stream as frames of recorded content, the passive recording storing the frames of recorded content of the ongoing content stream in a passive recording buffer;
    receiving a user indication to generate a note based on the recorded content of the passive recording of the ongoing content stream;
    processing the frames of recorded content in the passive recording buffer into an audio stream;
    generating a note of the ongoing content stream from the audio stream and storing the note in a note file;
    receiving an indication to associate a category with the generated note from the user; and
    annotating the generated note with the category in the note file.

2. The computer implemented method of claim 1, wherein the indication to associate the category with the generated note from the user is received from the user after the note has been generated and stored in the note file.

3. The computer implemented method of claim 1, wherein the indication to associate the category with the generated note from the user is automatically applied as a function of generating the note based on the recorded content of the passive recording of the ongoing content stream.

4. The computer implemented method of claim 3, wherein the indication to associate the category with the generated note from the user is included as part of the user indication to generate the note based on the recorded content of the passive recording of the ongoing content stream.

5. The computer implemented method of claim 1, wherein the category associated with the generated note is one of a plurality of predetermined categories for annotating a generated note.

6. The computer implemented method of claim 5, wherein the plurality of predetermined categories for annotating a generated note are user configurable.

7. The computer implemented method of claim 1 further comprising:
    receiving an indication to associate a plurality of categories with the generated note from the user; and
    annotating the generated note with the plurality of categories in the note file.

8. The computer implemented method of claim 1, wherein the generated note is stored in the note file in association with a meeting corresponding to the ongoing content stream.

9. The computer implemented method of claim 8, wherein the generated note is stored in the note file as one of a plurality of notes associated with the meeting corresponding to the ongoing content stream.

10. A computer readable medium bearing computer executable instructions which, when executed on a computing system comprising at least a processor, carry out a method for generating notes annotated with a category from an ongoing content stream, the method comprising:
- initiating passive recording of an ongoing content stream as frames of recorded content, the passive recording storing the frames of recorded content of the ongoing content stream in a passive recording buffer;
- receiving a user indication to generate a note based on the recorded content of the passive recording of the ongoing content stream;
- processing the frames of recorded content in the passive recording buffer into an audio stream;
- receiving a user indication to associate a category of a plurality of predetermined categories with the generated note;
- generating a note of the ongoing content stream from the audio stream;
- annotating the generated note with the category in the note file; and
- storing the note in a note file in association with an event corresponding to the ongoing content stream.

11. The computer readable medium of claim 10, wherein the user indication to associate a category of a plurality of predetermined categories with the generated note is received from a user after the note has been generated and stored in the note file.

12. The computer readable medium of claim 10, wherein the user indication to associate a category of a plurality of predetermined categories with the generated note is automatically applied as a function of generating the note based on the recorded content of the passive recording of the ongoing content stream.

13. The computer readable medium of claim 12, wherein the user indication to associate the category with the generated note from the user is a part of the user indication to generate the note based on the recorded content of the passive recording of the ongoing content stream.

14. The computer readable medium of claim 10, wherein the plurality of predetermined categories are user configurable.

15. The computer readable medium of claim 10, the method further comprising:
- receiving a user indication to associate an additional category of the plurality of predetermined categories with the generated note; and
- annotating the generated note with additional category in the note file.

16. The computer readable medium of claim 10, wherein the generated note is stored in the note file as one of a plurality of notes associated with a meeting corresponding to the ongoing content stream.

17. A computing device for generating annotated notes from an ongoing content stream, the computing device comprising a processor and a memory, wherein the processor executes instructions stored in the memory as part of or in conjunction with additional components to generate notes from an ongoing content stream, the additional components comprising:
- a passive recording buffer temporarily storing a predetermined amount of recorded content of an ongoing content stream, wherein the recorded content is stored as a plurality of frames of recorded content;
- an audio recording component generating a plurality of frames of recorded content of the ongoing content stream;
- a passive recording component obtaining the plurality of frames of recorded content of the ongoing content stream from the audio recording component and storing the plurality of frames of the recorded content to the passive recording buffer;
- an annotation component annotating a generated note with a category; and
- a note generator component initiating a passive recording process via the passive recording component, receiving an indication from a user, via a user interface component, to capture the plurality of frames of the recorded content of the ongoing content stream, generate an audio stream from the plurality of frames of the recorded content, generating a note from the audio stream, annotating the generated note with a category via the annotation component, and storing the generated note in a note file in a data store.

18. The computing device of claim 17, wherein the indication from the user to capture the plurality of frames of the recorded content of the ongoing content stream includes an indication to annotate the generated note with a category.

19. The computing device of claim 17, wherein the generated note is stored in the note file in the data store in association with a meeting corresponding to the ongoing content stream.

20. The computing device of claim 17, wherein the generated note is stored in the note file in the data store as one of a plurality of notes in association with a meeting corresponding to the ongoing content stream.

* * * * *